United States Patent
Chhabra et al.

(10) Patent No.: US 10,992,567 B2
(45) Date of Patent: Apr. 27, 2021

(54) TRAFFIC ENGINEERING ATTRIBUTE FOR AVOIDING PACKET PATHS WITH SIGNAL DEGRADE

(71) Applicant: Ciena Corporation, Hanover, MD (US)

(72) Inventors: Mukesh Chhabra, New Delhi (IN); Mohit Batra, New Delhi (IN); Kyle Gosselin-Harris, Greenacres, WA (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/238,875

(22) Filed: Jan. 3, 2019

(65) Prior Publication Data
US 2020/0162364 A1 May 21, 2020

(30) Foreign Application Priority Data
Nov. 21, 2018 (IN) .............................. 201811043889

(51) Int. Cl.
*H04L 12/721* (2013.01)
*H04L 12/759* (2013.01)
*H04L 12/723* (2013.01)
*H04L 12/26* (2006.01)

(52) U.S. Cl.
CPC ........ *H04L 45/123* (2013.01); *H04L 43/0823* (2013.01); *H04L 43/10* (2013.01); *H04L 45/028* (2013.01); *H04L 45/50* (2013.01)

(58) Field of Classification Search
CPC ... H04L 45/123; H04L 43/0823; H04L 43/10; H04L 45/028; H04L 45/50; H04L 45/22; H04L 47/12
See application file for complete search history.

(56) References Cited

U.S. PATENT DOCUMENTS

| 9,860,164 | B2 | 1/2018 | Jilani et al. |
| 10,044,606 | B2 | 8/2018 | Mishra et al. |
| 10,735,318 | B2 * | 8/2020 | Liu ..................... H04L 41/5022 |
| 2003/0147645 | A1 * | 8/2003 | Imajuku ............. H04Q 11/0005 398/7 |
| 2007/0058607 | A1 * | 3/2007 | Mack-Crane ........... H04L 45/12 370/351 |

(Continued)

OTHER PUBLICATIONS

D. Katz et al., Traffic Engineering (TE) Extensions to OSPF Version 2, Network Working Group, Category: Standards Track, The Internet Society, Sep. 2003, pp. 1-14.

(Continued)

*Primary Examiner* — Kibrom T Hailu
(74) *Attorney, Agent, or Firm* — Clements Bernard Walker; Lawrence A. Baratta, Jr.; Christopher L. Bernard

(57) ABSTRACT

A packet network includes a plurality of network elements interconnected to one another via a plurality of links, and systems and methods include, responsive to detecting a signal degrade condition on a link in the packet network, advertising the signal degrade condition on the link; maintaining a Traffic Engineering database which includes signal degrade condition status based on the advertising; and, responsive to path computation through the packet network, determining a best path considering the signal degrade condition status of the plurality of links. The systems and methods include further include, responsive to detecting the signal degrade condition on the link has cleared, advertising the signal degrade condition has cleared on the link.

20 Claims, 6 Drawing Sheets

(56) References Cited

U.S. PATENT DOCUMENTS

| | | | |
|---|---|---|---|
| 2011/0058487 A1* | 3/2011 | Kotrla | H04L 41/0659 |
| | | | 370/242 |
| 2011/0292787 A1* | 12/2011 | Kotrla | H04L 12/14 |
| | | | 370/216 |
| 2014/0071825 A1 | 3/2014 | Chhabra et al. | |
| 2014/0247829 A1 | 9/2014 | Gautam et al. | |
| 2015/0103821 A1 | 4/2015 | Gilson et al. | |
| 2015/0109906 A1* | 4/2015 | Abbas | H04L 45/125 |
| | | | 370/225 |
| 2016/0028602 A1 | 1/2016 | Mishra et al. | |
| 2016/0050119 A1 | 2/2016 | Chhabra et al. | |
| 2016/0142319 A1* | 5/2016 | Abbas | H04L 47/746 |
| | | | 370/237 |
| 2016/0261501 A1* | 9/2016 | Hegde | H04L 45/22 |
| 2016/0352622 A1 | 12/2016 | Gautam et al. | |
| 2017/0063672 A1 | 3/2017 | Chhabra et al. | |
| 2017/0093487 A1* | 3/2017 | Grammel | H04J 14/021 |
| 2017/0222916 A1* | 8/2017 | Surender | H04L 41/0663 |
| 2017/0230265 A1* | 8/2017 | Mishra | H04L 41/26 |
| 2017/0264565 A1 | 9/2017 | Gosselin-Harris et al. | |
| 2017/0339028 A1 | 11/2017 | Holness et al. | |
| 2018/0076976 A1 | 3/2018 | Chhabra et al. | |
| 2018/0131622 A1* | 5/2018 | Liang | H04L 45/38 |
| 2018/0309615 A1 | 10/2018 | Batra et al. | |
| 2019/0372858 A1* | 12/2019 | Krishnamurthy | H04L 41/22 |

OTHER PUBLICATIONS

Y. Rekhter et al., A Border Gateway Protocol 4 (BGP-4), Network Working Group, Category: Standards Track, The Internet Society, Jan. 2006, pp. 1-104.

T. Li et al., IS-IS Extensions for Traffic Engineering, Network Working Group, Category: Standards Track, The Internet Society, Oct. 2008, pp. 1-17.

I. Busi et al., Operations, Administration, and Maintenance Framework for MPLS-Based Transport Networks, Internet Engineering Task Force (IETF), ISSN: 2070-1721, Sep. 2011, pp. 1-62.

G. Swallow et al., MPLS Fault Management Operations, Administration, and Maintenance (OAM), Internet Engineering Task Force (IETF), ISSN: 2070-1721, Nov. 2011, pp. 1-17.

International Telecommunication Union, ITU-T G.8031/Y.1342, Ethernet linear protection switching, Jan. 2015, pp. 1-96.

\* cited by examiner

| 1 | INSTANCE ||
|---|---|---|
| LS AGE | OPTIONS | 10 |
| 1 | INSTANCE ||
| ADVERTISING ROUTER |||
| LS SEQUENCE NUMBER |||
| LS CHECKSUM | LENGTH ||
| TYPE | LENGTH ||
| VALUE... |||

*FIG. 2*

TRAFFIC ENGINEERING ATTRIBUTE FOR AVOIDING PACKET PATHS WITH SIGNAL DEGRADE

FIELD OF THE DISCLOSURE

The present disclosure generally relates to packet networking. More particularly, the present disclosure relates to systems and methods for systems and methods for a Traffic Engineering (TE) attribute used for avoiding packet paths with a signal degrade condition.

BACKGROUND OF THE DISCLOSURE

Packet networks, such as Multiprotocol Label Switching-Traffic Engineering (MPLS-TE), can utilize various Traffic Engineering (TE) parameters for path selection to establish dynamic tunnels. Example parameters can include Link Color, Link Cost, Shared Risk Link Group (SRLG), and the like. However, there are no conventional approaches to take link quality into account (e.g., measured through Signal Degrade) for creating or redialing new or existing tunnels. Due to the lack of a signaling mechanism for a Signal Degrade condition in the network, it is possible that Label Switched Paths (LSPs) are established over links that are not performing well, i.e., over links with a Signal Degrade condition. Things can be worse in the case of LSP re-optimization. For example, assume an LSP re-opt tunnel is established over a degraded link, a customer will see even more unpredictable traffic loss patterns as the tunnel attempts to re-optimize.

Also, in Border Gateway Protocol Labeled Unicast (BGP-LU), Border Gateway Protocol Prefix Independent Convergence (BGP-PIC), Segment Routing (SR), etc. there are no conventional approaches that exploit a Signal Degrade parameter for path selection. Protocols like BGP that are used in BGP-LU/PIC architecture or SR deployments do not have any defined procedure for propagating signal degrade information that can be used as a criterion in dynamic route selection or statically by a Software Defined Networking (SDN) controller.

BRIEF SUMMARY OF THE DISCLOSURE

In an embodiment, a method includes, in a packet network including a plurality of network elements interconnected to one another via a plurality of links, responsive to detecting a signal degrade condition on a link in the packet network, advertising the signal degrade condition on the link; maintaining a Traffic Engineering database which includes signal degrade condition status based on the advertising; and, responsive to path computation through the packet network, determining a best path considering the signal degrade condition status of the plurality of links. The method can further include, responsive to detecting the signal degrade condition on the link has cleared, advertising the signal degrade condition has cleared on the link. The method can further include monitoring the link utilizing Operations, Administration, and Maintenance (OAM) Protocol Data Units (PDUs); and detecting the signal degrade condition on the link based on the OAM PDUs. The detecting can be based on one of a Bit Error Rate (BER) being below a BER threshold, a frame loss rate being below a frame loss rate threshold, and a frame latency and/or jitter rates being over a latency and/or jitter rate threshold. The detecting can be based on an Ethernet Synthetic Loss Measurement. The path computation can utilize Constrained Shortest Path First (CSPF) and a plurality of Traffic Engineering parameters including the signal degrade condition status. The packet network can utilize Multiprotocol Label Switching (MPLS) and the path computation is for a new Label Switched Path (LSP) or a redial of an existing LSP. The packet network can utilize Border Gateway Protocol (BGP) and the advertising is based on an optional transitive attribute in a BGP UPDATE message. The packet network can utilize Segment Routing and the advertising is a Segment Identifier (SID) Signal State which identifies each of the plurality of links and associated signal degrade condition status. The advertising can be via a Sub-Type-Length-Value (TLV) included in an Extended IS Reachability TLV. The advertising can be via a Sub-Type-Length-Value (TLV) included in an Open Shortest Path First-Traffic Engineering (OSPF-TE) Link State Advertisement.

In another embodiment, a network element includes one or more ports interconnected to links in a packet network; a switching fabric interconnected to the one or more ports; and a controller configured to, responsive to detection of a signal degrade condition on a link in the packet network, cause an advertisement of the signal degrade condition on the link; communicate with a Traffic Engineering database which includes signal degrade condition status based on the advertisement; and, responsive to path computation through the packet network, determine a best path considering the signal degrade condition status of the plurality of links. The controller can be further configured to, responsive to detection the signal degrade condition on the link has cleared, cause an advertisement that the signal degrade condition has cleared on the link. The controller can be further configured to cause monitoring of the link utilizing Operations, Administration, and Maintenance (OAM) Protocol Data Units (PDUs); and detect the signal degrade condition on the link based on the OAM PDUs. The path computation can utilize Constrained Shortest Path First (CSPF) and a plurality of Traffic Engineering parameters including the signal degrade condition status. The packet network can utilize Multiprotocol Label Switching (MPLS) and the path computation is for a new Label Switched Path (LSP) or a redial of an existing LSP. The packet network can utilize Border Gateway Protocol (BGP) and the advertising is based on an optional transitive attribute in a BGP UPDATE message. The packet network can utilize Segment Routing and the advertising is a Segment Identifier (SID) Signal State which identifies each of the plurality of links and associated signal degrade condition status. The advertising can be via one of a Sub-Type-Length-Value (TLV) included in an Extended IS Reachability TLV; and a Sub-Type-Length-Value (TLV) included in an Open Shortest Path First-Traffic Engineering (OSPF-TE) Link State Advertisement.

In a further embodiment, a Traffic Engineering (TE) database system includes a processor communicatively coupled to a data store; and memory storing instructions that, when executed, cause the processor to, responsive to detection of a signal degrade condition on a link in a packet network, receive an advertisement of the signal degrade condition on the link; store in the data store signal degrade condition status based on the advertisement; receive an advertisement that the signal degrade condition has cleared on the link; update the signal degrade condition status based on the advertisement that the signal degrade condition has cleared on the link; and, responsive to path computation through the packet network, provide the signal degrade condition status on one or more links in the packet network.

BRIEF DESCRIPTION OF THE DRAWINGS

The present disclosure is illustrated and described herein with reference to the various drawings, in which like reference numbers are used to denote like system components/ method steps, as appropriate, and in which:

FIG. 2 is a block diagram of an Open Shortest Path First-Traffic Engineering (OSPF-TE) Link State Advertisement (LSA);

DETAILED DESCRIPTION OF THE DISCLOSURE

The present disclosure relates to systems and methods for systems and methods for a Traffic Engineering (TE) attribute used for avoiding packet paths with a signal degrade condition. The systems and methods incorporate a Signal Degrade (SD) parameter as a TE parameter for establishing dynamically signaled LSP tunnels (unidirectional or bidirectional). The Resource Reservation Protocol-Traffic Engineering (RSVP-TE) signaling mechanism is time and bandwidth consuming. Further, streaming traffic such as voice or video is extremely sensitive to a signal degrade condition. Therefore, considering signal degrade as an attribute for establishing tunnels is important for a service provider to provide a quality end-user experience and to meet Service Level Agreements (SLAs). The systems and methods include a new Type-Length-Value (TLV) field under the Intermediate System-Intermediate System (IS-IS) extended reachability information TLV or Open Shortest Path First-Traffic Engineering (OSPF-TE) opaque Link State Advertisement (LSA). This feature can be configured through a Command Line Interface (CLI) or any Network Management System (NMS) interface.

The systems and methods can extend the same concept to various other packet switching technologies such as Segment Routing and/or Seamless MPLS that extensively use Border Gateway Protocol (BGP) to propagate path attribute information about various prefixes (e.g., Network Layer Reachability Information (NLRI)). The systems and methods include a new "Optional Transitive" path attribute referred to as SIGNAL_DEGRADE for each NLRI that can be used for manipulating the best path selection.

Network

Figure 1:
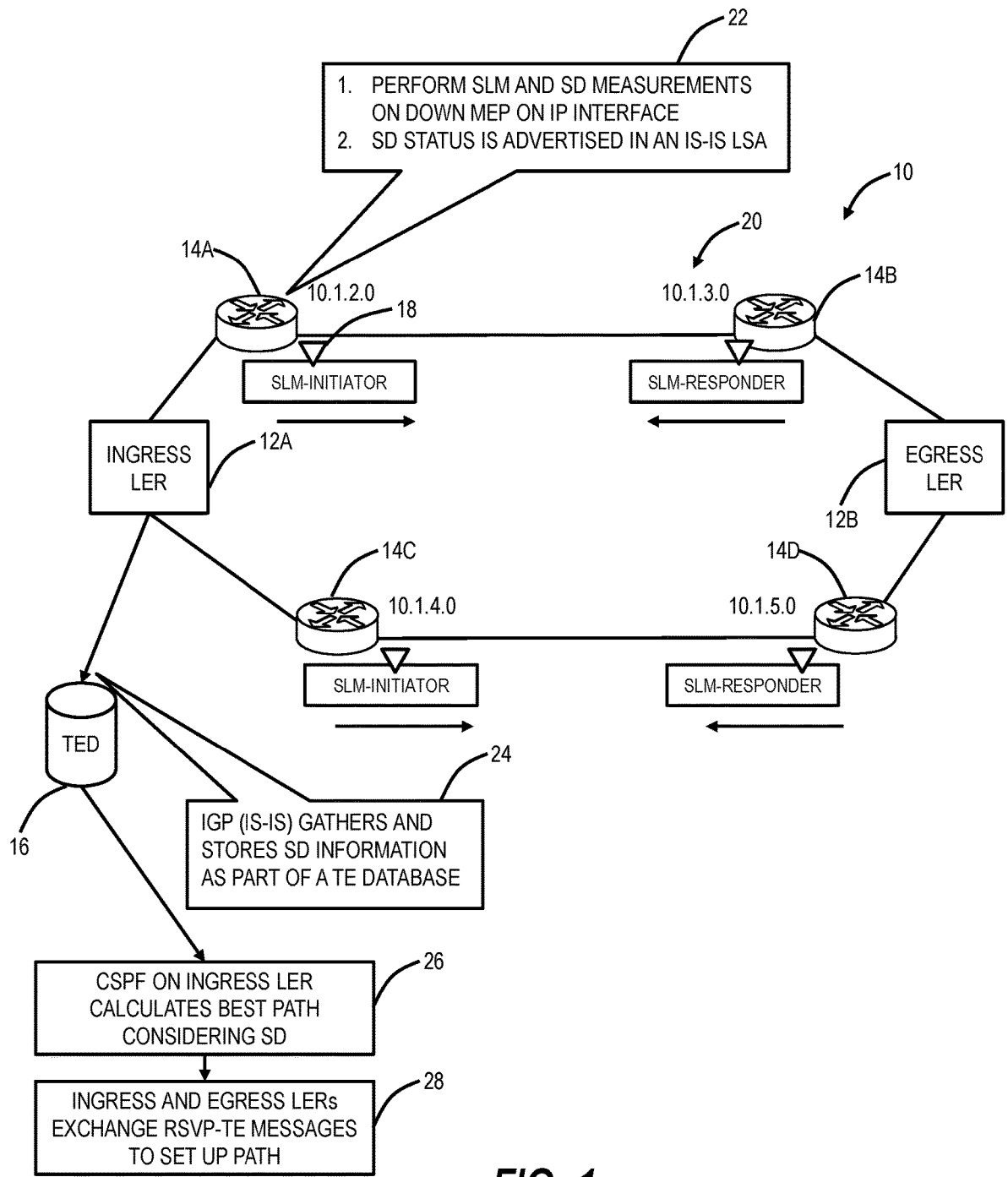
FIG. 1 is a network diagram of an example Multiprotocol Label Switching (MPLS) network for illustrating the systems and methods.

FIG. 1 is a network diagram of an example MPLS network 10 for illustrating the systems and methods. The MPLS network 10 generally operates by directing data from one network node to another via short path labels as opposed to long network addresses. MPLS tunnels include Label Switched Paths (LSPs) which are paths through an MPLS network set via signaling (such as through Label Distribution Protocol (LDP), Resource Reservation Protocol-Traffic Engineering (RSVP-TE), Border Gateway Protocol (BGP), etc.). The network 10 includes an ingress Label Edge Router (LER) 12A and an egress LER 12B interconnected by multiple Label Switched Routers (LSRs) 14A, 14B, 14C, 14D and a Traffic Engineering Database (TED) 16.

The MPLS network 10 is presented herein for illustration purposes, and those of ordinary skill in the art will recognize other deployments can include additional network elements, fewer network elements, different topologies, etc. Within the MPLS network 10, each LSR is configured to forward traffic along LSPs between the LERs. MPLS is used in the MPLS network 10 to reduce the number of lookups performed at the various network elements 12, 14. For example, a packet can be received by the ingress LER 12A of an LSP which conventionally performs a lookup to determine which label should be pushed onto the packet to switch the packet onto an LSP to the next hop through the MPLS network 10 to reach its destination. When the packet arrives at intermediary LSRs, 14A, 14B the LSR will read the MPLS label and replace the MPLS label with a new MPLS label. MPLS thus allows a single route lookup to be performed at the edge of the MPLS network 10 and allows label switching to be used instead of lookups to forward the packet across the MPLS network 10.

In Dynamic MPLS networks, LSP tunnels are created and monitored using signaling protocols such as Resource Reservation Protocol-Traffic Engineering (RSVP-TE). For such tunnels, TE (Traffic Engineering) parameters are configured on Internet Protocol (IP) interfaces. The TE parameters are distributed by the use of Interior Gateway Protocol (IGP) protocols such as Open Shortest Path First (OSPF), IS-IS, etc. and they build the TE topology of the MPLS network 10 and distribute it to each MPLS node in MPLS network 10. These TE parameters are used in the Contained Shortest Path First (CSPF) calculation to pick candidate links from the local TE database that meets the LSP TE requirements and then use the RSVP signaling mechanism to build the shortest path to the destination.

The following are some example TE parameters that are distributed in an IGP LSA and used by CSPF algorithm to determine best or shortest LSP Path a) Shared Link Risk Group (SRLG), b) Resource Affinity (color group), c) TE Link Metric, d) Bandwidth requirements, and e) Explicit Route Object (ERO).

As described herein, it is possible some links are not experiencing a complete signal failure but a Signal Degrade condition that may lead to intermittent connectivity frame drops. Therefore, it is in the best interests of the service provider to avoid those links to establish LSP's through RSVP signaling.

The systems and methods address this issue by monitoring signal degrade conditions on links on either an LSR 14 or LER 12 and then propagating the same to the LER/LSR nodes using IS-IS or OSPF link state advertisements. The CSPF algorithm can subsequently avoid those links with a signal degrade condition as candidate links from the local TE database and therefore RSVP signaling to establish tunnels can be avoided from those specific set of links. Thus, the systems and methods achieve signal degrade LSP path avoidance.

Signal Degrade is a loss of signals between two or more communicating devices in the network 10 such as due to environmental conditions, poor devices, fiber cut, etc. Some of the traditional detection procedures include Bit Error Rates (BER) over the threshold (e.g., $>10^{-8}$), frame loss rates over the threshold, frame latency/jitter rates over the threshold, etc. Examples of Signal Degrade are also described in commonly-assigned U.S. patent application Ser. No. 15/159,196, filed May 19, 2016, and entitled "PROTECTION SWITCHING SYSTEMS AND METHODS IN A PACKET NETWORK BASED ON SIGNAL DEGRADE," the contents of which are incorporated herein by reference. Also, various techniques for Operations, Administration, and Maintenance (OAM) are described in ITU-T G.8031/Y.1731 "OAM functions and mechanisms for Ethernet based networks" (08/15), RFC 6427 "MPLS Fault Management Operations, Administration, and Maintenance (OAM)," (11/20011), and RFC 6371 "Operations, Administration, and Maintenance Framework for MPLS-Based Transport Networks," (09/2011), the contents of each are incorporated herein by reference.

In an embodiment, Y.1731 Synthetic Loss Measurement (SLM) tests can be used for signal degrade detection. In FIG. 1, Y.1731 synthetic-loss tests exchange synthetic frames on the link to be monitored for signal degrade over a configured measurement window (i.e., duration) and compare frame loss with a configurable threshold to determine the presence of an SD condition on the link. For example, an SLM test includes an initiator and a responder. In this example, the LSRs 14A, 14C are initiators and the LSRs 14B, 14D are the respective responders. Further, there are DOWN Maintenance End Points (MEPs) 18 at each LSR 14.

The signal degrade criteria based on SLM tests can be defined as follows:

| | |
|---|---|
| True | FER ≥ T |
| False | FER < T | where FER=Frame (Error/Loss) (Rate/Ratio), T=configured threshold value.

In an example illustrated in FIG. 1, the LSR 14A can perform SLM and SD measurements on the DOWN MEP 18 at the IP interface 20 10.1.2.0. On detecting signal degrade condition (set or clear) on an IP interface 20 IS-IS or OSPF LSA shall propagate the information through the MPLS network 10 which then can subsequently be used in CSPF calculations and performing RSVP signaling (step 22). The TED 16 can receive the LSA and use IGP (IS-IS) to gather and store SD information (step 24). For a new or revised path, the ingress LER 12A can use CSPF which calculates the best path considering SD from the TED 16 (step 26). The ingress and egress LERs 12A, 12B can exchange RSVP-TE messages to set up the path (step 28).

The systems and methods can operate seamlessly in different packet network deployments that use BGP Protocol (including BGP-LU) or Segment Routing. In the case of network deployments that use BGP, the systems and methods can include a new "Optional Transitive" attribute that BGP routers understand. Segment Routing deployments that deploy BGP to propagate "segment ID" information can also use the proposed BGP Protocol Data Unit (PDU) for transmitting signal degrade information.

Use Case—Avoiding SD Link in MPLS-TE

In the case of MPLS-TE deployments, building traffic engineered path is basically a three-phase process. First, IGP protocols such as OSPF-TE and IS-IS-TE gather information related to the network topology and resources such as link-color, bandwidth, SRLG, etc. Second, CSPF on the ingress LER 12A calculates the best path using the information gathered by the IGP protocols and user-defined constraints. Third, RSVP-TE sets up the path calculated by CSPF.

Again, in FIG. 1, a Synthetic Loss Measurement is performed on the DOWN MEP 18 created on the IP interface 20. Subsequently, the results of SLM are used to calculate signal degrade for a link, and the results are propagated through IS-IS or OSPF Link State PDUs to the neighboring nodes. This information forms part of CSPF database (TED 16) and can be used by RSVP-TE to create new tunnels or redial existing tunnels. On receiving a signal degrade "clear," RSVP-TE can again redial to the primary path or remain with the same path that was created when the signal degrade was received.

It is to be noted that SLM/SLR (Synthetic Loss Measurement/Synthetic Loss Response) frames inherit the Media Access Control (MAC) address and L2 transforms the IP interface 20 and it is assumed that MAC shall already have been resolved using some external protocol like Address Resolution Protocol (ARP).

Sub-Type-Length-Value (TLV)

In an embodiment, the systems and methods include a sub-TLV to the Extended IS Reachability TLV with TLV type 22. The Extended IS Reachability TLV is described in RFC 5305, "IS-IS Extensions for Traffic Engineering," October 2008, the contents of which are incorporated herein by reference. The Extended IS Reachability TLV structure is defined as follows 7 octets of system ID and pseudonode number, 3 octets of default metric, 1 octet of length of sub-TLVs, and 0-244 octets of sub-TLVs. Each sub-TLV includes a sequence of 1 octet of sub-type, 1 octet of length, and 0-242 octets of value.

Certain sub-TLVs that are currently defined are as follows and the present disclosure proposes to add a new Signal Degrade sub-TLV (e.g., type 19) to the existing list.

| Sub-TLV type | Length (octets) | Name |
|---|---|---|
| 3 | 4 | Administrative group (color) |
| 6 | 4 | IPv4 interface address |
| 8 | 4 | IPv4 neighbor address |
| 9 | 4 | Maximum link bandwidth |
| 10 | 4 | Reservable link bandwidth |
| 11 | 32 | Unreserved bandwidth |
| 18 | 3 | TE default metric |
| 19 | 4 | Signal Degrade on a link |
| 250-254 | | Reserved for Cisco specific extensions |
| 255 | | Reserved for future expansion |

The Signal Degrade sub-TLV shall operate in the same manner as the other types of Sub-TLVs and according to RFC 5305. The information (value) includes a link and whether this link is set to have an SD condition or is clear of a previously set SD condition.

TLV

In another embodiment, the same information from the Signal Degrade sub-TLV can be coded in a TLV format and propagated using a Traffic Engineering LSA (type-1) in the OSPF-TE protocol (Link TLV). For example, OSPF-TE is described in RFC 3630, "Traffic Engineering (TE) Extensions to OSPF Version 2," September 2003, the contents of which are incorporated herein by reference. FIG. 2 is a block diagram of an OSPF-TE LSA 40.

In an embodiment, a new sub-TLV is proposed for the Link TLV in the OSPF-TE LSA 40. This can include the following format:

| | |
|---|---|
| Type | Link TLV - type 2 |
| Sub-TLV Type Value | 10 - Signal Degrade and four octets in length Signal Degrade Present(1)/Absent(0) followed by a signal degrade threshold value (T) |

Configuration Support

The decision to create a new tunnel or a tunnel redial can be provisioned through a CLI or any NMS interface. In an embodiment, the following CLI commands are provided as an example for enabling or disabling signal-degrade action on dynamic co-routed or unidirectional tunnels.

Enabling Signal Degrade on an IP interface 20—Propagates SD information through IS-IS mpls traffic-eng set ip-interface <ip-interface-name> sd-monitor <enabled|disabled>

Enabling Signal Degrade—Configures RSVP-TE to include/exclude SD parameter while creating or redialing tunnel.

Example-1—MPLS Co-Routed Bidirectional Dynamic Tunnels gmpls tp-tunnel create rsvp-ingress-corout <tunnel-name> dest-ip <ip-addr> [sd-trigger-action <enabled|disabled>]

Example-2—Unidirectional Tunnels gmpls tp-tunnel create rsvp-ingress-unidir <tunnel-name> dest-ip <ip-addr> [sd-trigger-action <enabled|disabled>]

Use Case—Avoiding SD Link in BGP (Including BGP-LU and BGP-PIC)

Figure 3:
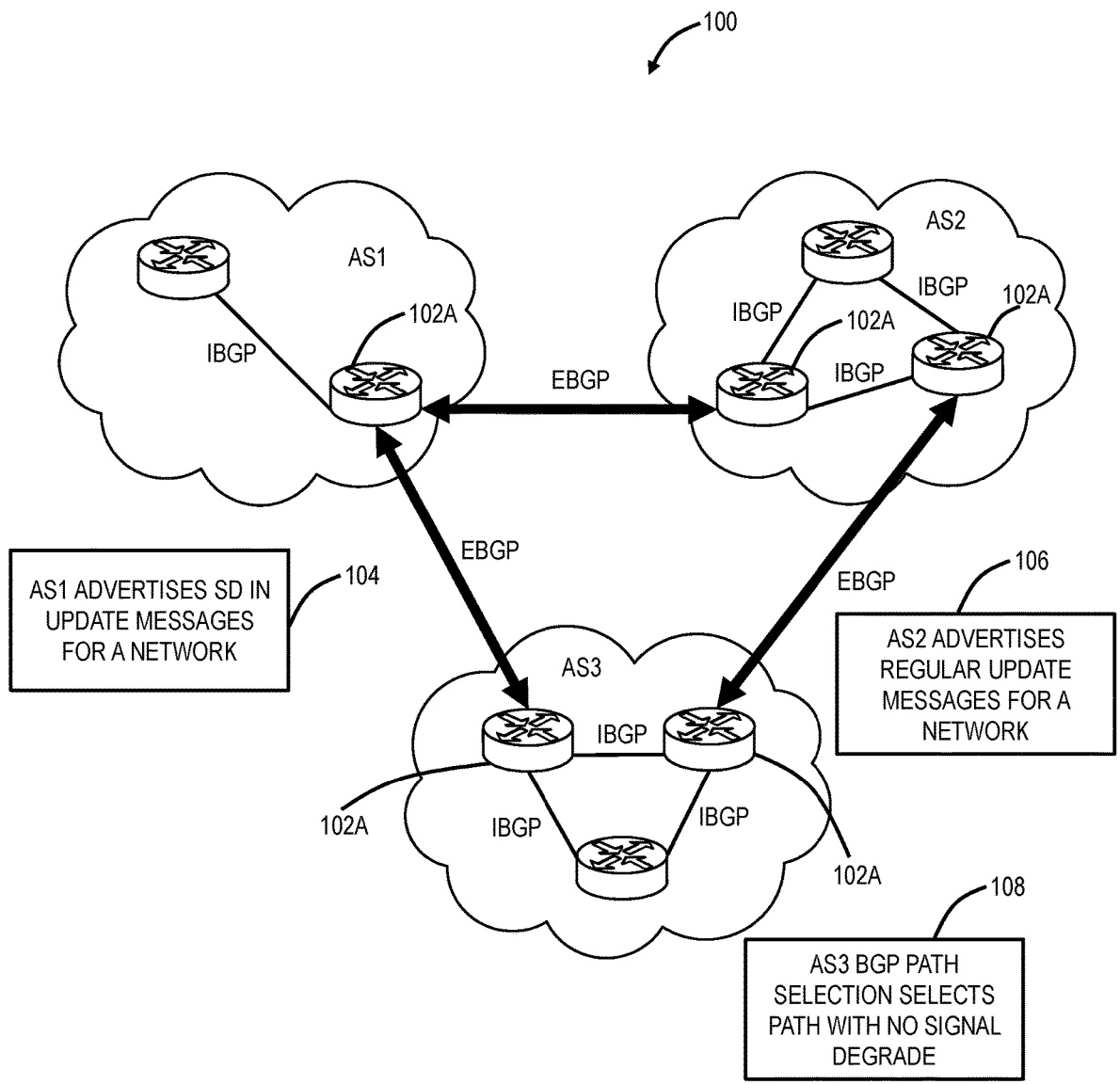
FIG. 3 is a network diagram of a network including three autonomous systems AS1, AS2, AS3 illustrating the systems and methods with Border Gateway Protocol (BGP)

FIG. 3 is a network diagram of a network 100 including three autonomous systems AS1, AS2, AS3 illustrating the systems and methods with BGP. Each autonomous system AS1, AS2, AS3 includes various nodes which communicate with one another inside the autonomous system via Interior Border Gateway Protocol (IBGP). Further, each autonomous system AS1, AS2, AS3 includes one or more BGP speaker nodes 102A which communicate between the autonomous systems AS1, AS2, AS3 using Exterior BGP (EBGP).

In order to build upon BGP-LU to propagate Signal Degrade information across the network 100 it is proposed that a new BGP Capability is announced by the BGP speaker node 102A to let its BGP peer node 102A know that BGP speaker node 102A supports the detection of Signal Degrade on its link/adjacencies and any routes carrying label path on detecting the Signal Degrade would be advertised with a Signal Degraded condition. The establishment of a BGP session between peers using the Signal Degrade situation is the same as that of any other capability supported by BGP peers.

Once a Signal Degrade condition is detected by a BGP speaker node 102A, then BGP UPDATE messages shall be advertised to corresponding BGP peers so that Signal Degrade condition can be propagated in the network 100. The defined BGP policies on the ingress BGP node can then determine whether it wants to reroute BGP traffic to the next available better path or stay on the current path. Similarly, when Signal Degrade condition is removed on a BGP adjacency, then such route shall be advertised with BGP route not carrying SD condition.

In the example of FIG. 3, the autonomous system AS3 receives two advertisements for a particular network (e.g., 172.16.1.0) from both the autonomous systems AS1, AS2. The advertisement from the autonomous system AS1 indicates that signal degrade is being experienced on its Network-Network Interface (NNI) link and therefore reachability from AS1 may experience degrade conditions (step 104) whereas the autonomous system AS2 advertises regular UPDATE messages without SD (step 106). The autonomous system AS3 BGP path select algorithm considers the "signal degrade" parameters in its routing decision and hence puts the selected path without signal degrade in its routing table (step 108).

Figure 4:
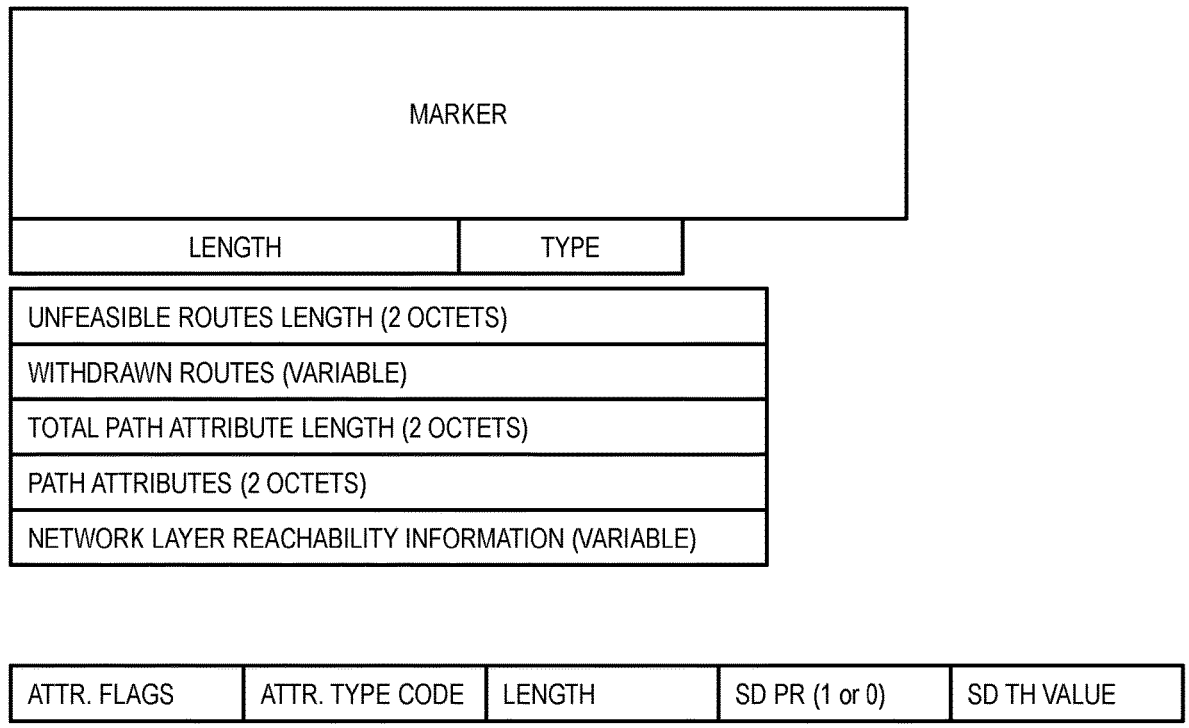
FIG. 4 is a block diagram of a "Signal Degrade" attribute used as an Optional Transitive attribute between BGP routers.

BGP is described, for example, in RFC 4271, "A Border Gateway Protocol 4 (BGP-4)," January 2006, the contents of which are incorporated herein by reference. FIG. 4 is a block diagram of a "Signal Degrade" attribute. The systems and methods introduce a "Signal Degrade" attribute as "Optional Transitive" attribute which means it may be recognized/not-recognized by BGP routers, but it must be passed on to other BGP routers. This attribute can subsequently be used to manipulate the best path selection algorithm. For any NLRI Prefix, this attribute shall indicate the condition of signal degrade (threshold) on the link over which this Prefix was learned. In an embodiment, the systems and methods introduce a new Type Code (8)—SIGNAL_DEGRADE as the name of this attribute. The attribute flags shall indicate that the attribute is "Optional Transitive" while the remaining octet shall indicate whether the Signal Degrade condition is present (1) or absent (0) along with signal degrade threshold (T) value (Each prefix list entry shall have corresponding attribute list entry indicating the signal degrade presence/absence along with the signal degrade threshold value).

Note that the remaining octets of the Path Attribute represent the attribute value and are interpreted according to the Attribute Flags and the Attribute Type Code.

Use Case—Avoiding SD Link in Segment Routing

Figure 5:
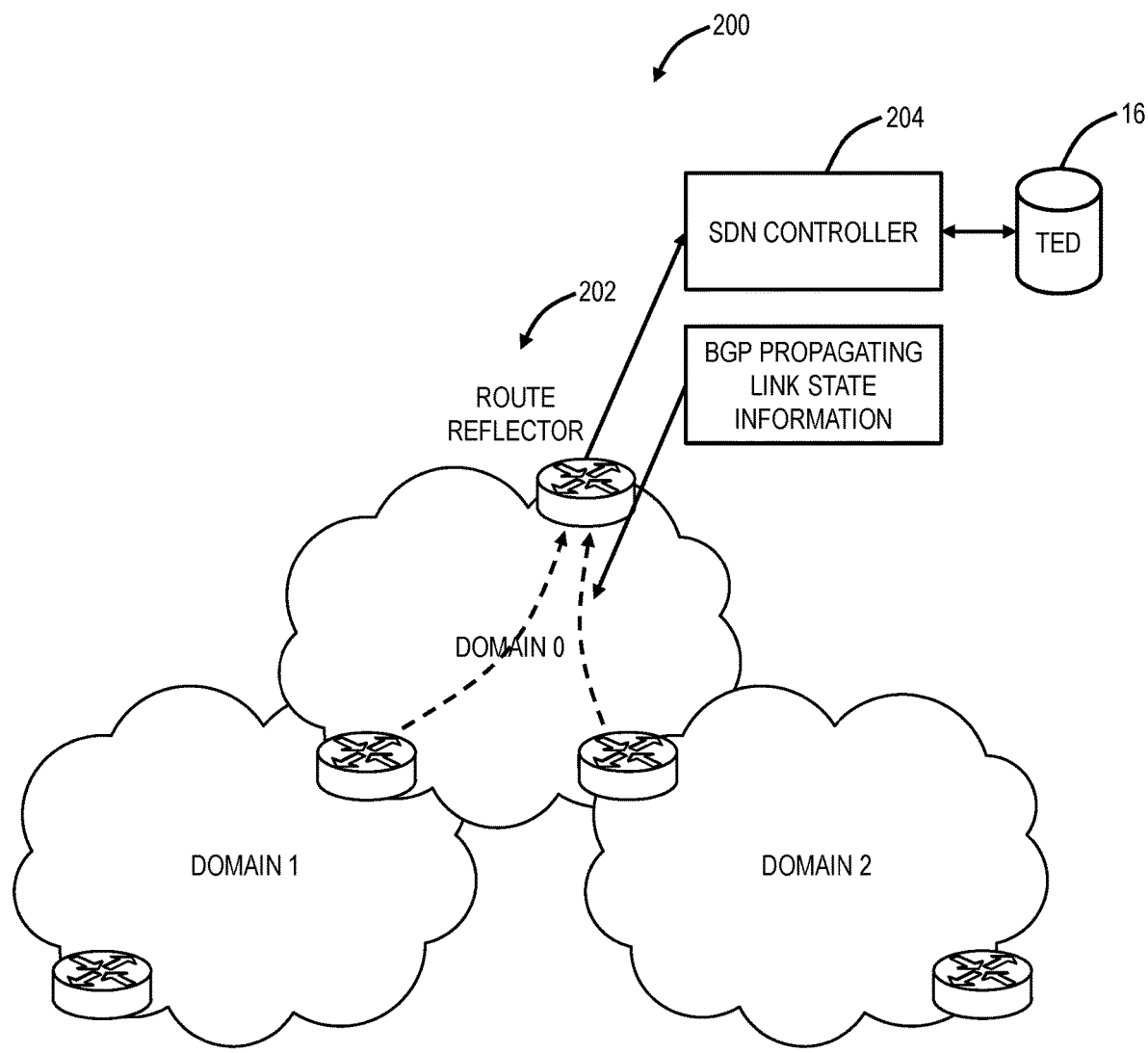
FIG. 5 is a network diagram of a Segment Routing (SR) network including three domains 0, 1, 2, a route reflector, and a Software Defined Networking (SDN) controller.

FIG. 5 is a network diagram of a Segment Routing (SR) network 200 including three domains 0, 1, 2, a route reflector 202, and a Software Defined Networking (SDN) controller 204. Segment Routing works by using the Segment IDs (SID) that are created in the network using IS-IS, OSPF and BGP extensions for Segment Routing. It does not use LDP and RSVP-TE protocols for setting up Segments in the network through which traffic shall pass. Additionally, Segment Routing is a source routing technique in which originator nodes decide the flow of the data frames in the network 200 and each node in the network 200 does not need to worry on maintaining the flows and state of the network 200.

In order to avoid the links that are facing Signal Degrade situation, it is proposed that originator node (or segment originator node) shall have knowledge of the which links in the network are facing the Signal Degrade condition. In Segment Routing, a prefix SID/adjacency SID is proposed to have a new metric called as "SID Signal State" (SSS). SSS shall be propagated in the network using the modifications proposed in this document to Extensions of IS-IS, OSPF and BGP protocols used for Segment Routing. The detection of Signal Degrade condition can be based upon using ETH-SLM (Synthetic Loss Measurement) as proposed herein.

In FIG. 5, a Path Computation Engine (PCE) can be located inside the SDN controller 204 which computes network paths based on network information. This information is acquired using an Exterior Gateway Protocol (EGP) such as EBGP. The Signal Degrade attribute TLV shall be carried in the BGP PDU's can be used by the SDN controller 204 for avoiding paths that are experiencing signal degrade.

Network Element

Figure 6:
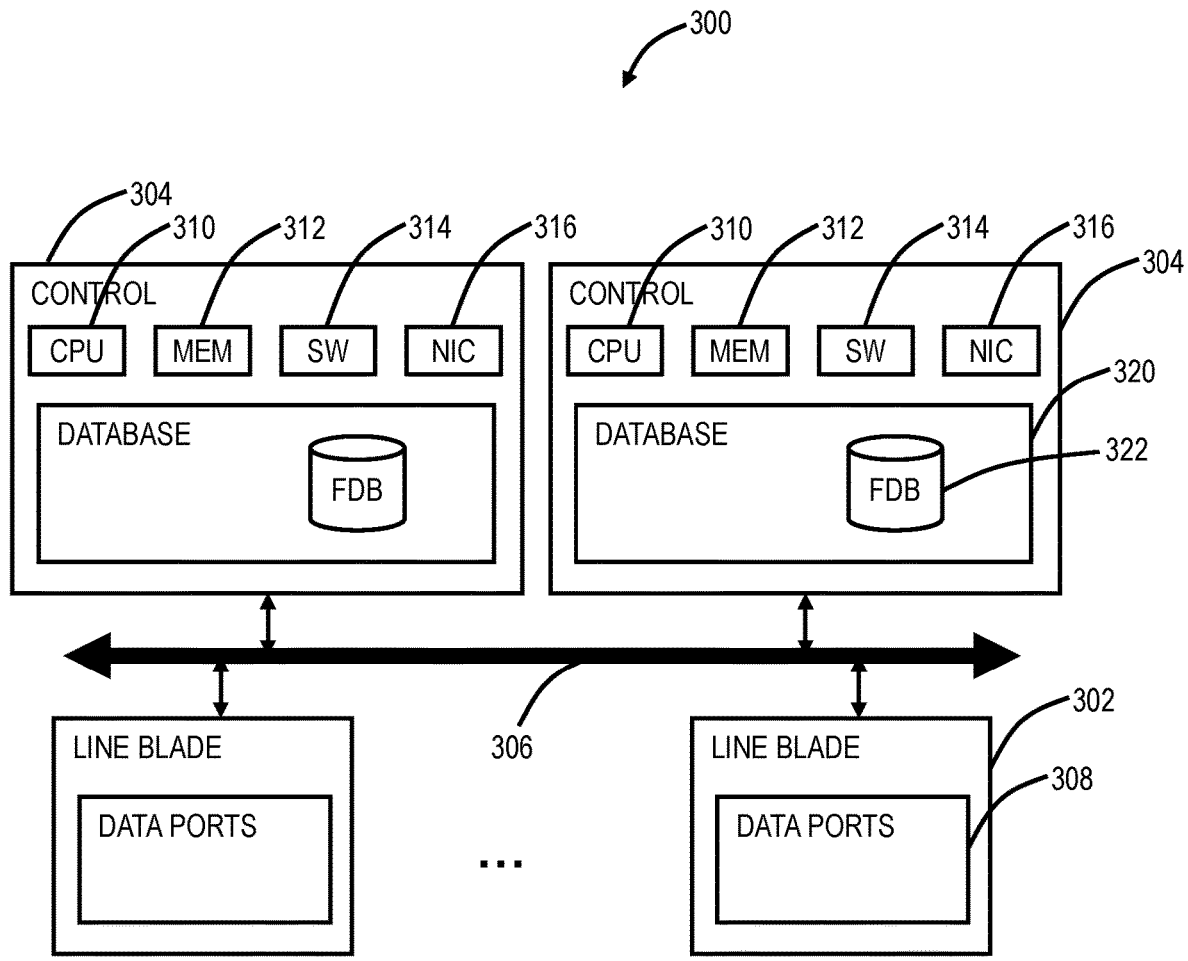
FIG. 6 is a block diagram of an example implementation of a network element.

FIG. 6 is a block diagram of an example implementation of a network element 300. In this embodiment, the network element 300 is an Ethernet network switch, but those of ordinary skill in the art will recognize the systems and methods contemplate operation in other types of network elements and other implementations, such as, for example, a layer two switch integrated within an optical network element. The network element 300 can form the LERs 12, the LSRs 14, the BGP speaker nodes 102A, etc. In FIG. 6, the network element 300 includes a plurality of blades 302, 304 interconnected via an interface 306. The blades 302, 304 are also known as line cards, line modules, circuit packs, pluggable modules, etc. and generally refer to components mounted within a chassis, shelf, etc. of a data switching device, i.e., the network element 300. In another embodiment, the functionality of each of the blades 302, 304 may be integrated into a single module, such as in the layer two switch integrated within an optical network element or a single integrated unit, i.e., a "pizza box." Each of the blades 302, 304 may include numerous electronic devices and optical devices mounted on a circuit board along with various interconnect including interfaces to the chassis, shelf, etc.

Two example blades are illustrated with line blades 302 and control blades 304. The line blades 302 generally include data ports 308 such as a plurality of Ethernet ports. For example, the line blade 302 may include a plurality of physical ports disposed on an exterior of the blade 302 for receiving ingress/egress connections. Additionally, the line blades 302 may include switching components to form a switching fabric via the backplane 306 between all of the data ports 308 allowing data traffic to be switched between the data ports 308 on the various line blades 302. The switching fabric is a combination of hardware, software, firmware, etc. that moves data coming into the network element 300 out by the correct port 308 to the next network element. "Switching fabric" includes switching units, or individual boxes, in a node; integrated circuits contained in the switching units; and programming that allows switching paths to be controlled.

The control blades 304 include a microprocessor 310, memory 312, software 314, and a network interface 316 to control packet switching. Specifically, the microprocessor 310, the memory 312, and the software 314 may collectively control, configure, provision, monitor, etc. the network element 300. The network interface 316 may be utilized to communicate with an element manager, an NMS, etc. Additionally, the control blades 304 may include a database 320 that tracks and maintains provisioning, configuration, operational data and the like, e.g., the TED 16. The database 320 may include a forwarding database (FDB) 322. In this example embodiment, the network element 300 includes two control blades 304 which may operate in a redundant or protected configuration such as 1:1, 1+1, etc.

In general, the control blades 304 maintain dynamic system information including Layer two forwarding databases, protocol state machines, and the operational status of the ports 308 within the network element 300. In an embodiment, the blades 302, 304 are configured to implement MPLS, BGP, SR, etc., and to implement the various processes, algorithms, methods, mechanisms, etc. described herein for implementing the systems and methods for a Traffic Engineering (TE) attribute used for avoiding packet paths with a signal degrade condition.

Those of ordinary skill in the art will recognize the network element 300 can include other components which are omitted for illustration purposes, and that the systems and methods described herein are contemplated for use with a plurality of different network elements with the network element 300 presented as an example type of network element. For example, in some embodiments, the line blades 302 and the control blades 304 can be implemented as a single module. In general, the systems and methods described herein contemplate use with any network element providing packet switching. Furthermore, the network element 300 is merely presented as one example device for the systems and methods described herein.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method comprising:
in a packet network comprising a plurality of network elements interconnected to one another via a plurality of links, responsive to detecting a signal degrade condition on a link of the plurality of links in the packet network, advertising the signal degrade condition of the link, wherein the signal degrade condition is detected based on packet Operations, Administration, and Maintenance (OAM) measurements and associated thresholds;

maintaining a Traffic Engineering database based on the advertising to include the signal degrade condition of the link; and responsive to path computation, selecting a path through the packet network considering a signal degrade condition of each of the plurality of links;

wherein the signal degrade condition is detected based on at least one of a frame loss rate being above a frame loss rate threshold and a frame latency being above a frame latency threshold; and wherein the packet network utilizes Segment Routing and the advertising is a Segment Identifier (SID) Signal State which identifies each of the plurality of links and associated signal degrade condition.

2. The method of claim 1, further comprising responsive to detecting the signal degrade condition on the link has cleared, advertising the signal degrade condition has cleared on the link.

3. The method of claim 1, further comprising monitoring the link utilizing OAM Protocol Data Units (PDUs); and detecting the signal degrade condition on the link based on the OAM PDUs.

4. The method of claim 3, wherein the detecting is based on an Ethernet Synthetic Loss Measurement.

5. The method of claim 1, wherein the path computation utilizes Constrained Shortest Path First (CSPF) and a plurality of Traffic Engineering parameters including the signal degrade condition.

6. The method of claim 1, wherein the packet network utilizes Multiprotocol Label Switching (MPLS) and the path computation is for a new Label Switched Path (LSP) or a redial of an existing LSP.

7. The method of claim 1, wherein the packet network utilizes Border Gateway Protocol (BGP) and the advertising is based on an optional transitive attribute in a BGP UPDATE message.

8. The method of claim 1, wherein the advertising is via a Sub-Type-Length-Value (TLV) included in an Extended IS Reachability TLV.

9. The method of claim 1, wherein the advertising is via a Sub-Type-Length-Value (TLV) included in an Open Shortest Path First-Traffic Engineering (OSPF-TE) Link State Advertisement.

10. A network element comprising:

one or more ports interconnected to links in a packet network;

a switching fabric interconnected to the one or more ports; and a controller configured to:

responsive to detection of a signal degrade condition on a link in the packet network, cause an advertisement of the signal degrade condition on the link, wherein the signal degrade condition is detected based on packet Operations, Administration, and Maintenance (OAM) measurements and associated thresholds;

communicate with a Traffic Engineering database based on the advertisement to include the signal degrade condition of the link; and responsive to path computation, selecting a path through the packet network considering a signal degrade condition of each of the plurality of links;

wherein the signal degrade condition is detected based on at least one of a frame loss rate being above a frame loss rate threshold and a frame latency being above a frame latency threshold, and wherein the packet network utilizes Segment Routing and the advertising is a Segment Identifier (SID) Signal State which identifies each of the plurality of links and associated signal degrade condition.

11. The network element of claim 10, wherein the controller is configured to responsive to detection of the signal degrade condition on the link has cleared, cause an advertisement that the signal degrade condition has cleared on the link.

12. The network element of claim 10, wherein the controller is configured to cause monitoring of the link utilizing OAM Protocol Data Units (PDUs); and detect the signal degrade condition on the link based on the OAM PDUs.

13. The network element of claim 10, wherein the path computation utilizes Constrained Shortest Path First (CSPF) and a plurality of Traffic Engineering parameters including the signal degrade condition.

14. The network element of claim 10, wherein the packet network utilizes Multiprotocol Label Switching (MPLS) and the path computation is for a new Label Switched Path (LSP) or a redial of an existing LSP.

15. The network element of claim 10, wherein the packet network utilizes Border Gateway Protocol (BGP) and the advertising is based on an optional transitive attribute in a BGP UPDATE message.

16. The network element of claim 10, wherein the advertising is via one of a Sub-Type-Length-Value (TLV) included in an Extended IS Reachability TLV; and a Sub-Type-Length-Value (TLV) included in an Open Shortest Path First-Traffic Engineering (OSPF-TE) Link State Advertisement.

17. A Traffic Engineering (TE) database system comprising:

a processor communicatively coupled to a data store; and memory storing instructions that, when executed, cause the processor to receive a first advertisement of a signal degrade condition on a link in a packet network, wherein the signal degrade condition is detected based on packet Operations, Administration, and Maintenance (OAM) measurements and associated thresholds;

store in the data store the signal degrade condition based on receiving the first advertisement;

receive a second advertisement that the signal degrade condition has cleared on the link;

update the signal degrade condition in the data store based on the second advertisement that the signal degrade condition has cleared on the link; and responsive to path computation, selecting a path through the packet network considering a signal degrade condition of one or more links in the packet network;

wherein the signal degrade condition is detected based on at least one of a frame loss rate being above a frame loss rate threshold and a frame latency being above a frame latency threshold; and wherein the packet network utilizes Segment Routing and the advertising is a Segment Identifier (SID) Signal State which identifies each of the plurality of links and associated signal degrade condition.

18. The TE database system of claim 17, wherein responsive to detecting the signal degrade condition on the link has cleared, the instructions cause the processing device to advertise the signal degrade condition has cleared on the link.

19. The TE database system of claim 17, wherein the instructions further cause the processing device to
- cause monitoring of the link utilizing OAM Protocol Data Units (PDUs); and
- detect the signal degrade condition on the link based on the OAM PDUs.

20. The TE database system of claim 17, wherein the path computation utilizes Constrained Shortest Path First (CSPF) and a plurality of Traffic Engineering parameters including the signal degrade condition.

* * * * *